(12) United States Patent
Nichols et al.

(10) Patent No.: US 10,480,732 B2
(45) Date of Patent: Nov. 19, 2019

(54) GOBO AND METHOD FOR MANUFACTURING A GOBO

(71) Applicant: AVID Labs, LLC, Fort Wayne, IN (US)

(72) Inventors: Joel Nichols, Columbia City, IN (US); Alex Tollington, Fort Wayne, IN (US); Jason Kabot, Huntertown, IN (US)

(73) Assignee: Avid Labs, LLC, Fort Wayne, IN (US)

( * ) Notice: Subject to any disclaimer, the term of this patent is extended or adjusted under 35 U.S.C. 154(b) by 0 days.

(21) Appl. No.: 15/286,928

(22) Filed: Oct. 6, 2016

(65) Prior Publication Data

US 2017/0097130 A1   Apr. 6, 2017

Related U.S. Application Data

(60) Provisional application No. 62/237,792, filed on Oct. 6, 2015.

(51) Int. Cl.
*F21S 10/00* (2006.01)
*F21W 121/00* (2006.01)
*G03B 21/00* (2006.01)

(52) U.S. Cl.
CPC ........ *F21S 10/007* (2013.01); *F21W 2121/00* (2013.01); *G03B 21/001* (2013.01)

(58) Field of Classification Search
CPC .................................................... F21S 10/007

USPC .................. 359/884, 889, 890, 891; 40/440; 362/322–324, 280–281; 101/127, 114, 101/128.4, 112; 33/563
See application file for complete search history.

(56) References Cited

U.S. PATENT DOCUMENTS

| | | | | |
|---|---|---|---|---|
| 148,291 | A * | 3/1874 | Fowler | B41F 15/02 101/112 |
| 2,156,279 | A * | 5/1939 | Gurley | B05C 17/06 101/127 |
| 3,457,400 | A * | 7/1969 | Appeldorn | B64F 1/06 362/307 |
| 7,703,948 | B2 * | 4/2010 | Dalsgaard | F21S 10/007 362/280 |

FOREIGN PATENT DOCUMENTS

EP           0621495 A1 * 10/1994 ............ F21S 10/007

* cited by examiner

*Primary Examiner* — Kristina M Deherrera
(74) *Attorney, Agent, or Firm* — Taylor IP, P.C.

(57) ABSTRACT

A gobo with a substrate having at least one peripheral edge a body extending from the peripheral edge, the body having two faces and a structural network on at least one of the two faces, the structural network generally extending to the peripheral edge. An optical pattern is disposed on or through the body, with the structural network extending on the body only to an edge of the optical pattern. The structural network is integral with the substrate.

20 Claims, 7 Drawing Sheets

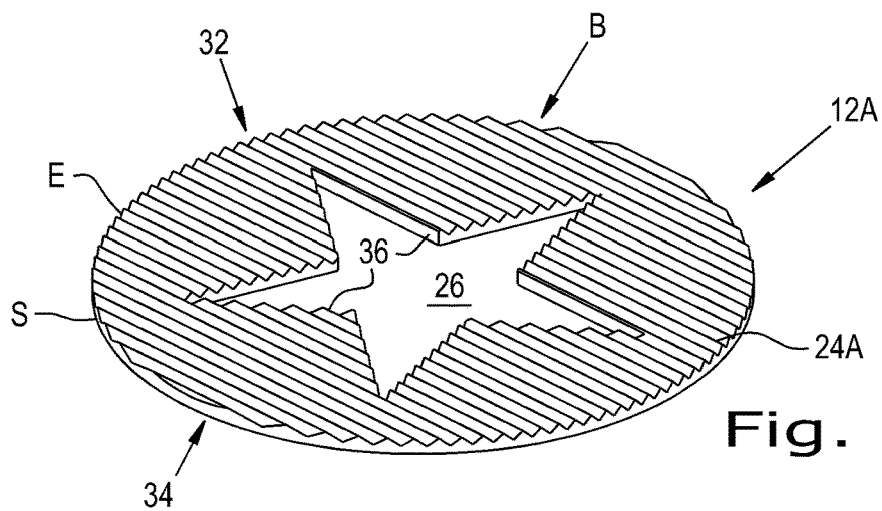
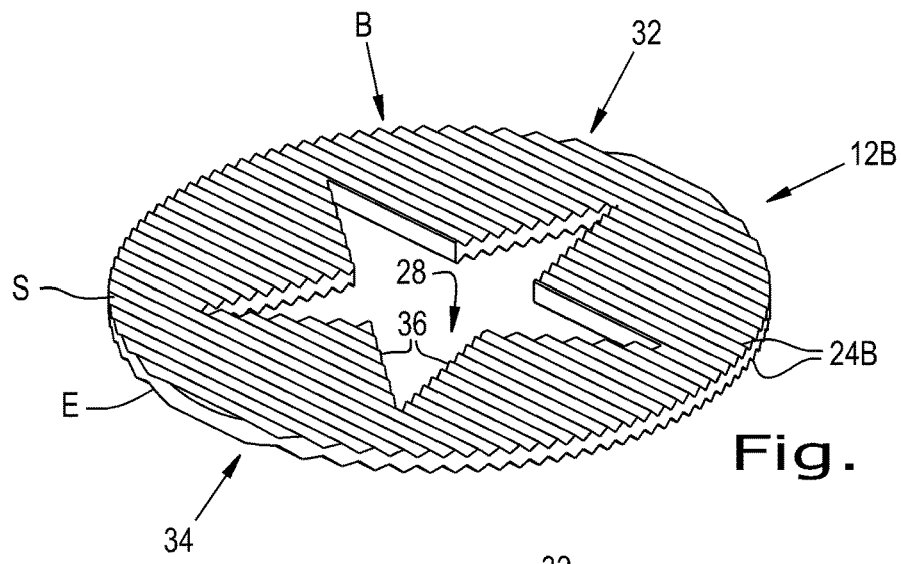
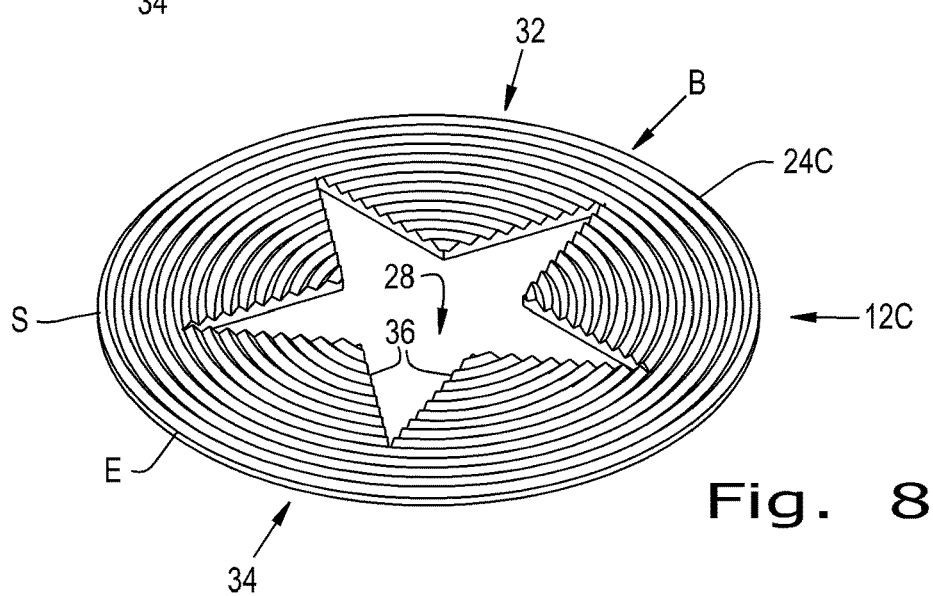

GOBO AND METHOD FOR MANUFACTURING A GOBO

CROSS REFERENCE TO RELATED APPLICATIONS

This is a non-provisional application based upon U.S. provisional patent application Ser. No. 62/237,792, entitled "GOBO WITH INTEGRAL STRUCTURAL FEATURES", filed Oct. 6, 2015, which is incorporated herein by reference.

BACKGROUND OF THE INVENTION

1. Field of the Invention

The present invention relates to projection, illumination and lighting, including but not limited to artistic lighting systems for creating or enhancing a particular mood and artistic effects creation using a gobo.

2. Description of the Related Art

It is oftentimes desired to project images, patterns, or colored light onto a background, wall, or other structure in an entertainment and an architectural setting. Luminaires or lighting units have been utilized in combination with images or patterns to create these projections or colored light. A common term of art used for a substrate, screen, mat, or other material having an image or pattern for projection by light is "gobo." The name gobo is thought to have been derived from the concept of "Go between" or "Goes before optics".

Gobos are a form of illuminated panel, which include images or patterns that are sharply focused, for example, corporate logos, regular or irregular patterns, or elements of stage scenery. Alternatively, the images or patterns on the gobos may be designed to suggest a mood or environment on a stage, such as a pattern suggesting light passing through leaves on a tree.

Gobos are used in theatres, television studios, concert venues, theme parks, night clubs, retail premises, offices, exhibition halls, and other venues. Gobos may be manufactured from a range of materials, such as metal, glass or plastic and are typically produced in a range of standard sizes and patterns designed to fit common luminaires so that they are easily inserted and removed in the luminaire. They are often used with stage lighting instruments to manipulate the shape of the light that is cast over a space or object. A metal gobo with patterned holes allows only the desired shape or pattern of light through, casting a specific pattern of light and shadow into the space.

Though the term "gobo" has come to generally refer to any device which produces patterns of light and shadow, in theatrical lighting applications the term more specifically refers to a device placed in 'the gate' or at the 'point of focus' between the light source and the lenses (or other optics). This placement is important because it allows a pattern with crisp, sharp edges to be projected onto a surface on the stage. Gobos placed after the optics do not have the option of such fine focus, and are more precisely called "flags" or "cookies".

Gobos may be used, in connection with projectors and simpler light sources, to create lighting scenes in a theatrical application. Simple gobos, incorporated into automated lighting systems, are popular at nightclubs and other musical venues to create moving shapes. Gobos may also be used for architectural lighting, as well as in interior design, as in projecting a company logo on a wall or other feature.

Gobos can be made from various materials. Common types include steel, glass and plastic/transparency gobos. Steel gobos use a metal template from which the image is cut, and are generally the most sturdy of the common gobo types, but often require modifications to the original design called bridging in order to display correctly. In order to correctly represent the letter "O" for example, small tabs or bridges must be made in order to keep the metal tab in the middle of the letter supported. This effect may be undesirable in more intricate patterns or designs.

Glass gobos are made from transparent glass with a partial mirror coating to block the light and produce "black" areas in the projected image. This eliminates any need for bridging, since the glass itself is the support, and allows more intricate images to be produced. Glass gobos can also include colored areas (much like stained glass windows), whether by multiple layers of dichroic glass (one for each color) glued on an aluminum or chrome coated black and white gobo, or by varying the thickness of the dichroic coating (and therefore the color) in a controlled way on a single piece of glass, making it possible to turn a color photo into a glass gobo. Glass gobos generally offer the highest image fidelity but are the most fragile. Usually, to create a glass gobo laser ablation or photo etching techniques are used.

Plastic gobos or transparency gobos can be used in LED ellipsoidal spotlights. These "LED Only" plastic gobos can be full color (like a glass gobo), but without the delicate nature.

In the past plastic gobos had been generally custom made—for when a pattern is needed in color and glass does not suffice. However, in a "traditional" (tungsten/halogen) light fixture, the focus point where a gobo must be placed is usually extremely hot, so these thin plastic films generally need to be used with special cooling elements to prevent them from being melted. A lapse in the cooling apparatus, even for just a few seconds, can cause plastic gobos in a traditional lighting instrument to be ruined.

Gobos are often used in weddings and corporate events to add a personal touch to the look of an event. Company logos, the couple's names, or just about any artwork can be turned into a projected image. Common locations that gobos are projected in corporate/wedding situations are: the wall behind the head table, the center of the dance floor, on the floor in front of the main entrance, and the most dominant wall.

The gobo is placed in the focal plane of the lantern (generally an ellipsoidal reflector spotlight). The gobo is inserted upside-down and back-to-front. The desired pattern is then projected, by the lantern, onto whatever surface it is pointed at, such as a wall or a dance floor.

What is needed is a method for manufacturing a resilient gobo in an economic manner.

SUMMARY OF THE INVENTION

Embodiments of the present invention projection, illumination and lighting, including but not limited to artistic lighting systems for creating or enhancing a particular mood and artistic effects creation.

The invention in one form is directed to a gobo with a substrate having at least one peripheral edge a body extending from the peripheral edge, the body having two faces and a structural network on at least one of the two faces, the structural network generally extending to the peripheral edge. An optical pattern is disposed on or through the body, with the structural network extending on the body only to an edge of the optical pattern. The structural network is integral with the substrate.

The invention in yet another form is directed to a method of manufacturing a gobo, which includes the steps of forming a substrate and forming an optical pattern. The substrate has at least one peripheral edge and a body extending from the peripheral edge. The body has two faces and a structural network on at least one of the two faces. The structural network generally extends to the peripheral edge. The forming an optical pattern takes place on or through the body of the substrate. The structural network extends on the body only to an edge of the optical pattern, and the structural network is integral with the substrate.

Advantageously, the present invention provides structural strength to a gobo and allows the structural network to provide some optical functions, such as reflectivity.

Additional features and advantages of the invention will be made apparent from the following detailed description of illustrative embodiments that proceeds with reference to the accompanying drawings.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 6 illustrates an embodiment of a monolithic gobo with structural ridges that help keep the flatness integrity of the gobo of the present invention;

FIG. 7 illustrates another embodiment of a monolithic gobo of the present invention;

FIG. 8 illustrates yet another embodiment of a monolithic gobo of the present invention;

DETAILED DESCRIPTION OF THE INVENTION

Figure 1:
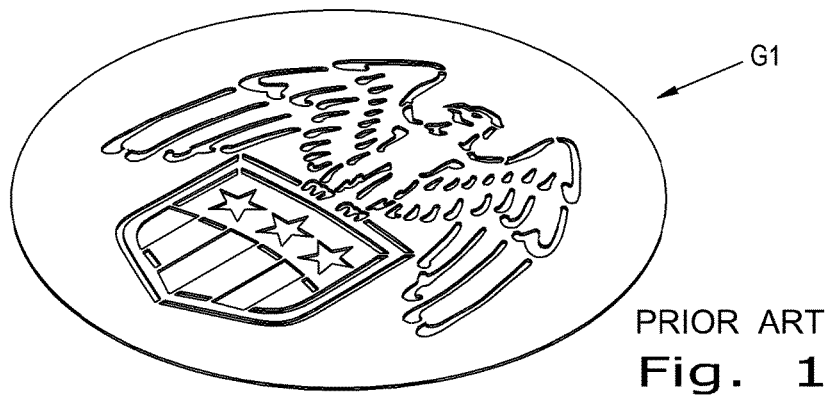
FIG. 1 illustrates a monolithic circular gobo.
Figure 2:
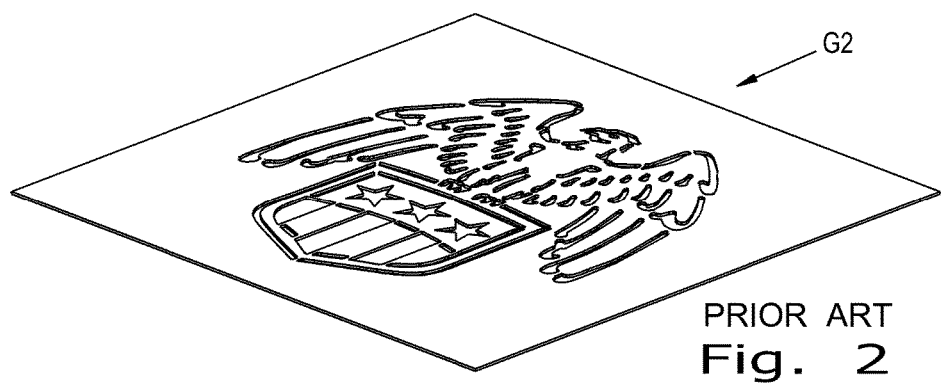
FIG. 2 illustrates a monolithic square or rectangular gobo.
Figure 3:
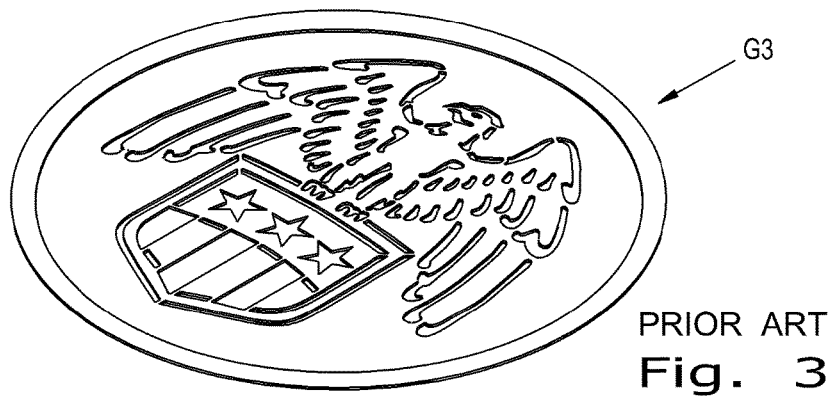
FIG. 3 illustrates a monolithic gobo having an edge that is raised, which can function as a bezel support.

Referring now to the drawings, and more particularly to FIGS. 1-3, there are illustrated three forms of prior art gobos including a gobo G1 having a monolithic circular shape (FIG. 1) that can be formed out of a range of materials. Commonly stainless steel is used and it is traditionally called a metal gobo G1. The thickness, shape and size of a monolithic gobo can vary depending upon application. FIG. 2 shows a monolithic square or rectangular gobo G2. FIG. 3 illustrates a monolithic gobo G3 that is formed with an edge that is raised. The raised edge also serves as a bezel support.

Figure 4:
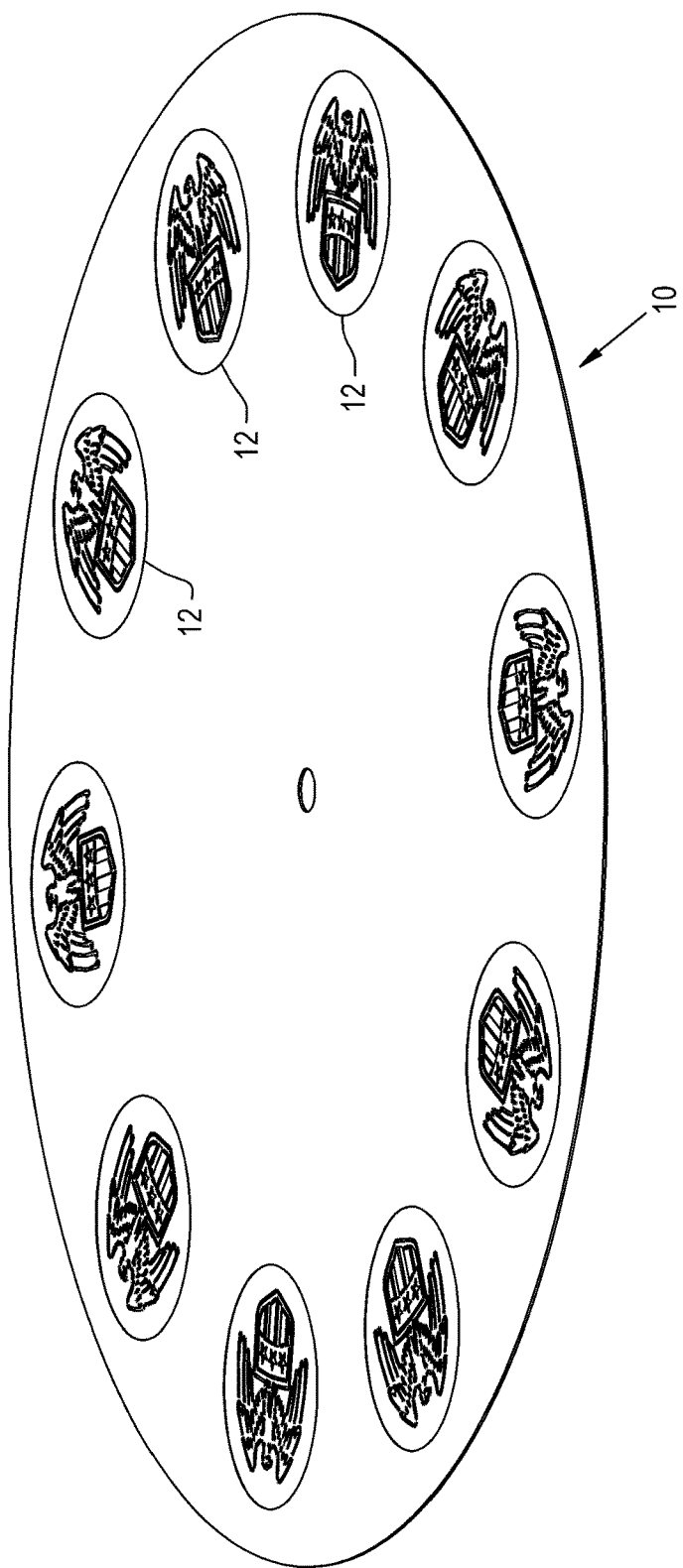
FIG. 4 illustrates an embodiment of the present invention in the form of a monolithic gobo wheel.

Now, additionally illustrated in FIG. 4 is a gobo wheel 10 and shows in this case a monolithic gobo wheel 10 formed using an additive manufacturing technique. Gobo wheel 10 has a multiple of gobos 12 made using the inventive method of the present invention. The gobo wheel 10 could also incorporate glass gobos 12 to form the image area.

Figure 5:
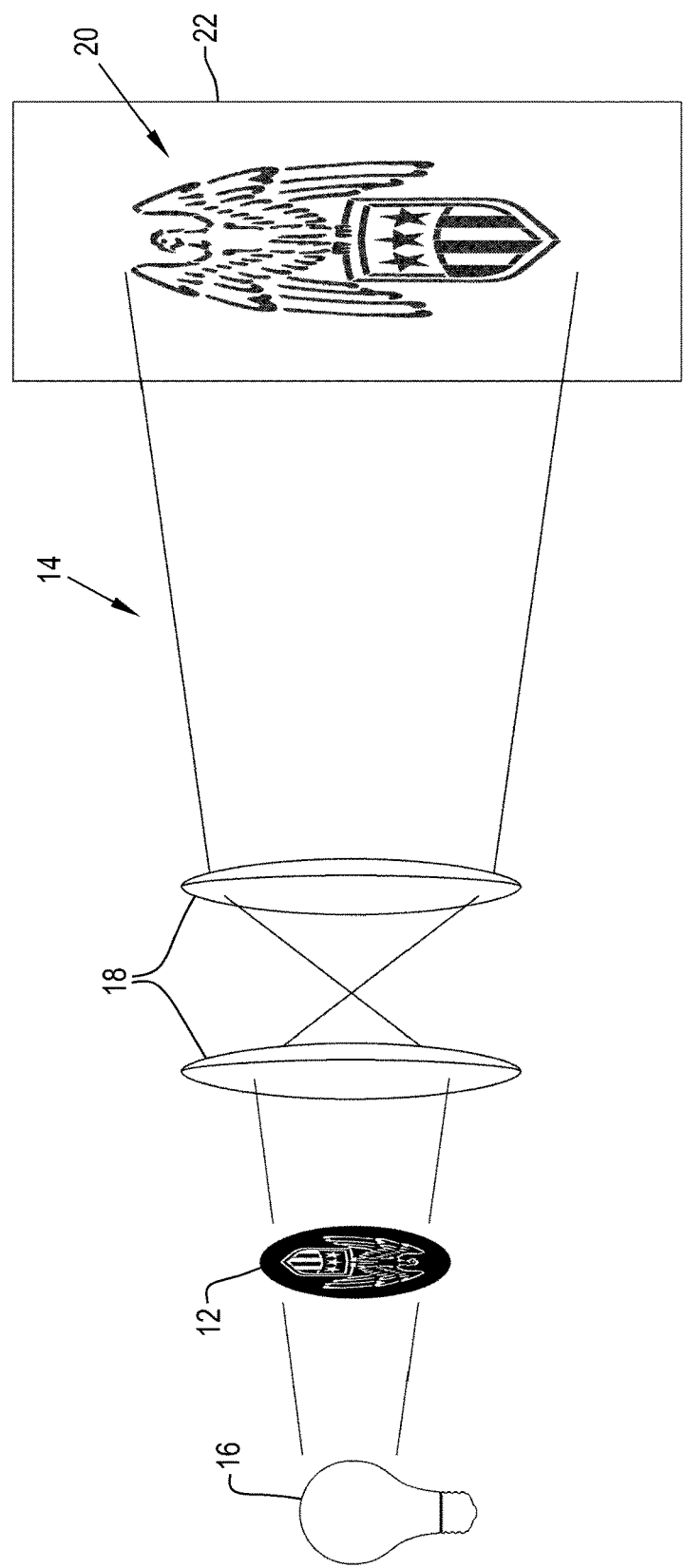
FIG. 5 shows in a somewhat schematic form an image projected on to a target from a light source with lens by way of a gobo.
Figure 9:
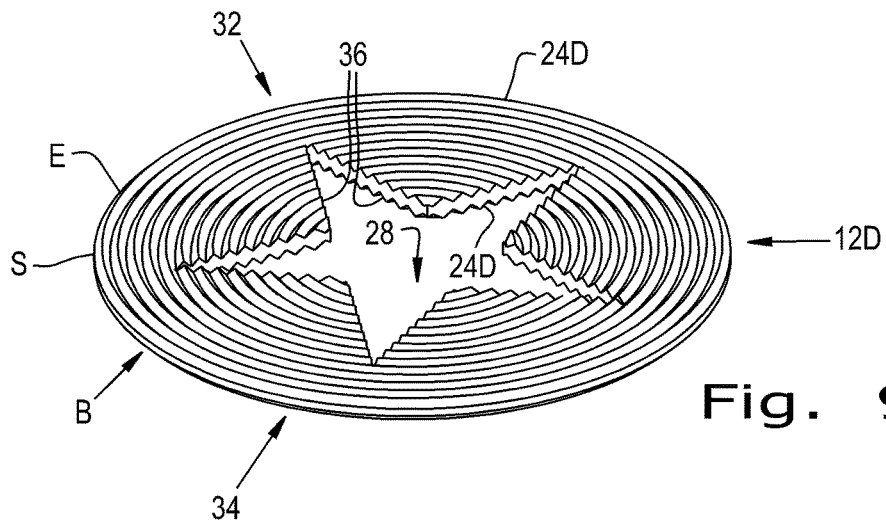
FIG. 9 illustrates still yet another embodiment of a monolithic gobo of the present invention.

A gobo 12 in the form of a physical stencil or template slotted inside, or placed in front of, a lighting source, such as a light projection system 14 of FIG. 5. Projection system 14 includes a light source 16, and lens 18, to emit an image 20 upon a surface 22. Gobo 12 is used to control the shape of emitted light 20 with integral structural features. The gobo 12 may be manufactured using additive techniques, milling or casting. This method includes formation of metal gobos 12 traditionally made using chemical etching and/or laser cutting and the formation of gobos using other materials. The integral structural features of the present invention increase the material structure stiffness, cooling, life of the gobo 12 and allow new materials to be used.

A gobo 12 is a physical pattern, stencil or template that is placed or slotted in front of a light 16 (such as LEDs, Laser or Incandescent) or a radiation source (such as IR or UV). The gobo 12 allows control of the light or radiation emitted by either absorbing or reflecting the unwanted emissions.

Gobos are widely used in lighting applications for many industries and can be made from a range of different materials including but not limited to stainless steel, steel, aluminum, titanium, brass, plastic and glass. The prior art manufacturing processes includes chemical etching, laser cutting, steel rule die, printing and laser ablation to remove unwanted material. Other processes include printing onto glass or plastic using a variety of printing processes. The previous stated methods and materials are known to create a product that has many limitations and issues. Some of these limitation and issues include breaking, cracking, warping, overheating and only a select limited number of materials may be used. The aforementioned processes are both time consuming and limited in their functionality. The introduction of the inventive gobo 12 with integral structural features, of the present invention, is more efficient, runs cooler, is structurally superior and provides subtler supporting features (bridges).

The present invention is a gobo 12 formed with integral structural features. The gobo 12 with integral structural features can be formed out of metal, plastic and any other suitable material. The gobo 12 with integral structural features is structurally, mechanically, visually and thermally superior whilst projecting the same or better quality of image that prior-art gobos.

Now, additionally referring to FIGS. 6-11 there are illustrated monolithic Gobos 12A-12F with structural ridges 24A-24F that keep the flatness integrity of the gobo 12 (the use of a reference number without letters following it is intended to generally refer to those items with the letters). The ridges 24A-24F also create a greater surface area for cooling and thermal flatness throughout gobo 12. The structural ridges 24A-24F may be constructed in but not limited to a linear fashion (ridges 24A and 24B on one side 32 as in FIG. 6 or both sides 32 and 34 as the ridges 24B of FIG. 7. The structural ridges 24 may also be constructed in a circular fashion as the ridges 24C-24E on one side 32 as ridges 24C of FIG. 8 or on both (FIG. 9) sides 32 and 34 of gobo 12D.

The linear ridges 24A and 24B may be manufactured (but not limited to) a triangular shaped cross-section of raised ridges, as can be seen along the inner edges 36 of optical patterns 26 and 28. The raised ridges may vary in size, shape and spacing based on the lighting fixture used and/or the gobo being produced.

Figure 10:
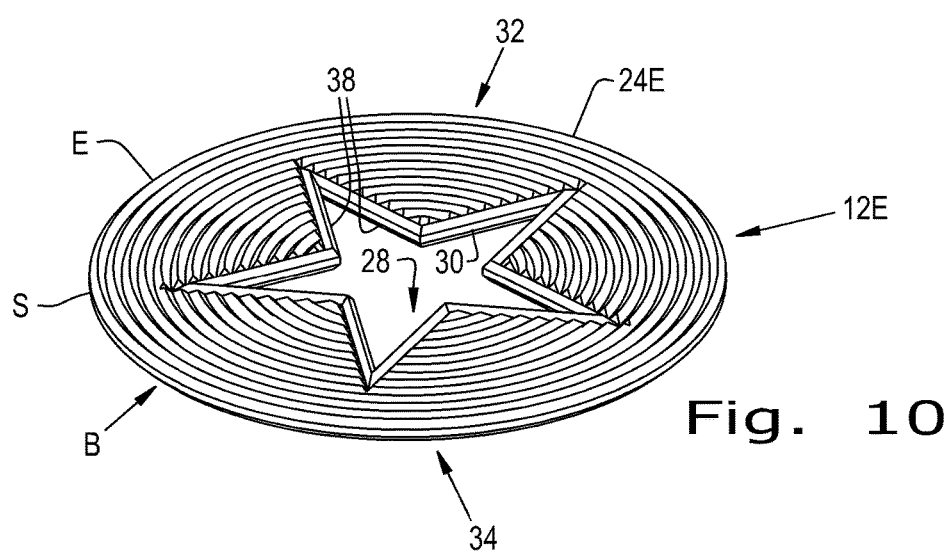
FIG. 10 illustrates still yet another embodiment of a monolithic gobo of the present invention.
Figure 11:
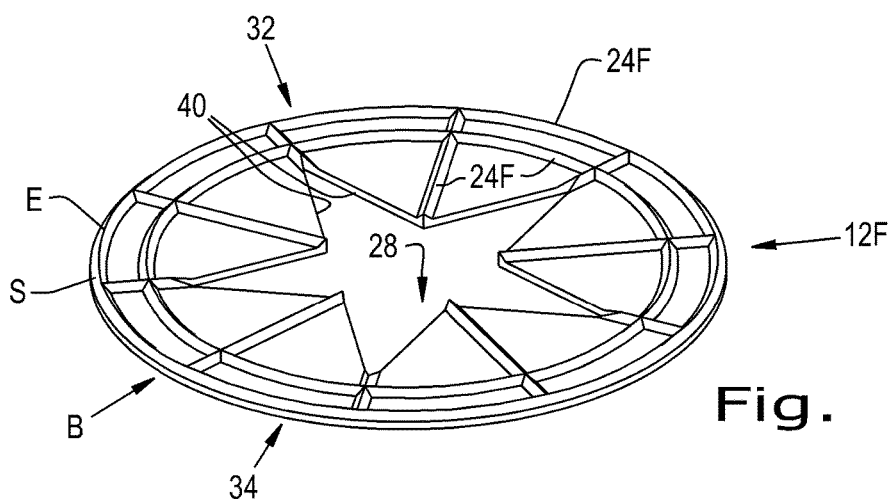
FIG. 11 illustrates still yet another embodiment of a monolithic gobo of the present invention.

The previous described structural ridges may also be made in combination with each other as shown in FIG. 10. Where linear ridges 30 may support the perimeter edge 38 of the image 28 and circular ridges 24E support the remaining area of the gobo 12E. Another method of creating a combination of ridge supports is used by supporting key features of the image 28 and the outer integrity of the Gobo as illustrate in FIG. 11, where ridges 24F are both linear and circular with the pattern and intersection of the ridges being selected to support key features of image 28, such as edges 40.

The inventive nature of the integral monolithic structural networks 24A-24F are completed in a way of not distorting or interfering with the projected images 26-28. These methods and designs result in more precise edges 36, 38 and 40 that in turn create a crisper projected image that has a true flat focus area.

Figure 12:
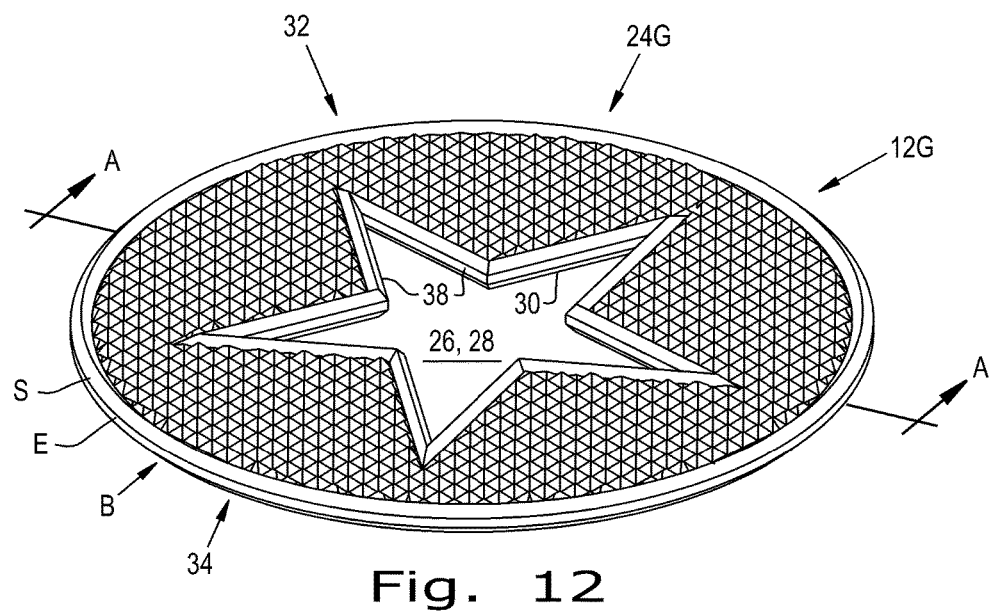
FIG. 12 illustrates still yet another embodiment of a monolithic gobo with micro reflective absorption structure of the present invention.
Figure 13:
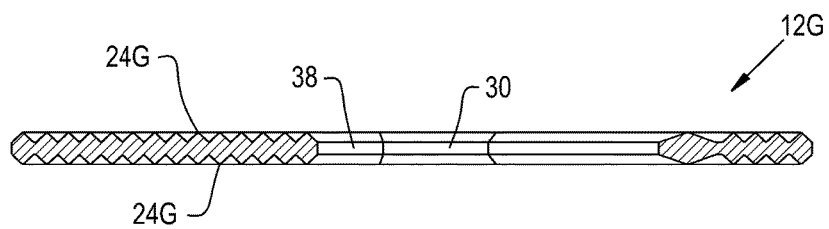
FIG. 13 is a cross-sectional view of the gobo of FIG. 12 taken at A-A.

Now, additionally referring to FIG. 12 there is shown a detailed monolithic gobo 12G with structural ridges 24G that is a micro-reflective absorption structure. This structure aids in cooling, but also reduces internal back reflection that can cause shadowing or ghosting images on a projection. The micro-reflective absorption structure is created using but not limited to raised or lowered structural spires and/or domes. This may be completed on one or both sides 32 and 34 of gobo 12G. The raised or lowered structures 24G may vary in size, shape and spacing based on the lighting fixture used and/or the gobo being produced. FIG. 13 is a cross-sectional view of FIG. 12 to show more detail of the structural formation.

Gobo 12 is placed in front of a light source 16 to form a pattern or image 20 with gobo 12 having a monolithically integral structural network 24 where the integral structural network provides increased support of subtle pattern features 26, 28. The pattern 26, 28 formed monolithically with the integral structural network can be a multitude of images as in wheel 10. The substrate S has a pattern formed monolithically with an integral structural network 24, and is composed of, but not limited to, glass, plastic, metal, or other composite materials. The structural network 24 allows for heat dissipation through increased surface area perpendicular to the source 16. The increased surface area is provided in the form of, but not limited to, linear or cylindrical ridges 24, pattern traced edges 38 or spires 24G of different shapes and sizes.

Figure 14:
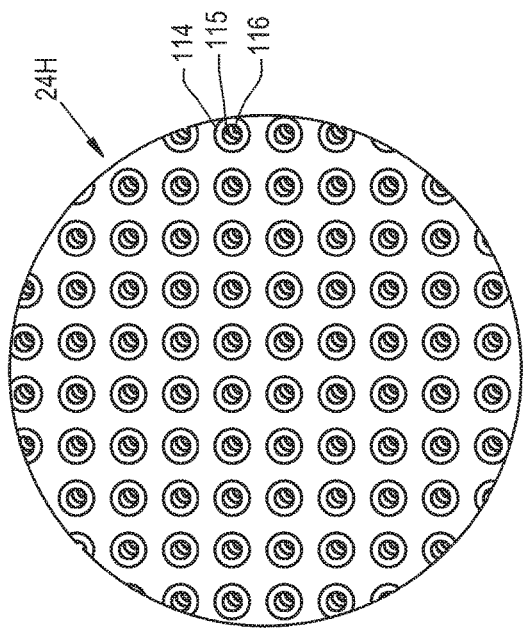
FIG. 14 is a plan view of a portion of a monolithic gobo with micro reflective absorption structure.
Figure 15:
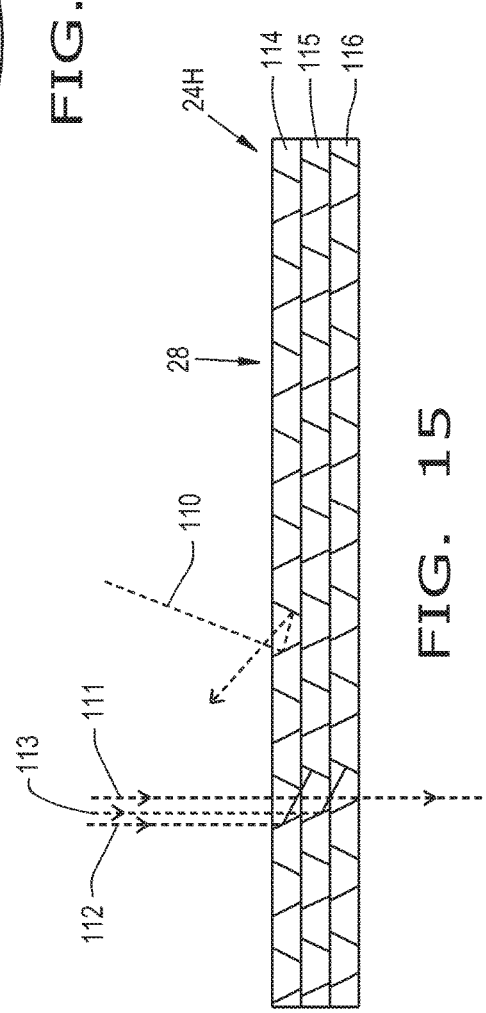
FIG. 15 is a cross-sectional view of the gobo of FIG. 14.

Now, additionally referring to FIGS. 14 and 15. The patterns formed monolithically with integral structural network 24, are also in the form of a three dimensional lattice arrangement 24F, 24G or 24H. The integral structural net or network 24G is formed using peaks and troughs to create a micro-reflective absorption surface. These structures 28 as illustrated in FIG. 15 reduce internal back reflection that can cause shadowing or ghosting of images on a projection. The pattern 26, 28 is formed monolithically with integral structural net 24 where pattern 28 can be a through hole 28 or pattern 26 or image 26 is made of varying thickness layers 114, 115 and 116, and deposited such that a grey scale image maybe achieved, with the transmission of light beams 110, 111, 112 and 113, from a source or sources (not shown), being dependent on the incidence and the angle of incidence to form the grey scale image. Additive manufacturing, milling or a casting processes can be used on body B of substrate S extending from peripheral edge E inward to an edge of the optical pattern 26, 28, but the forming of body B or pattern 26, 28, are not limited to precision casting, micro milling, SLS 3D printing, FDM 3D printing, DLP cured resin 3D printing, Laser Deposition and Laser Sintering.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A gobo, comprising:
   a substrate having:
      at least one peripheral edge;
      a body extending from the edge, the body having two faces and a structural ridge network on at least one of the two faces, the structural ridge network generally extending to the peripheral edge; and
      an optical pattern disposed on or through the body, the structural ridge network extending on the body only to an edge of the optical pattern, the structural ridge network being integral with the substrate, the structural ridge network having a plurality of ridges that are at least one of adjacent and intersecting each other, the plurality of ridges include some ridges that intersect other ridges, wherein the structural ridge network includes surface area of the faces that are perpendicular to the face.

2. The gobo of claim 1, wherein the optical pattern is formed on the substrate monolithically with the body.

3. The gobo of claim 1, wherein the optical pattern is formed through the substrate monolithically with the body.

4. The gobo of claim 1, wherein the substrate is at least one of a glass, a plastic, a metal, and a composite material.

5. The gobo of claim 1, wherein the structural ridge network is on the two faces.

6. The gobo of claim 1, wherein the structural ridge network includes at least one of linear ridges, cylindrical ridges, pattern traced edges and spires.

7. The gobo of claim 1, wherein the optical pattern is formed monolithically with the integral structural network where the optical pattern is an image made of a varying thickness portion of the substrate and the image is deposited on the varying thickness portion such that a grey scale image results.

8. The gobo of claim 1, wherein the substrate results from or is subject to additive manufacturing, a milling process, a casting processes, a precision casting process, micro milling, 3D printing, cured resin 3D printing, laser deposition and laser sintering.

9. A gobo, comprising:
   a substrate having:
      at least one peripheral edge;
      a body extending from the edge, the body having two faces and a structural ridge network on at least one of the two faces, the structural ridge network generally extending to the peripheral edge; and
      an optical pattern disposed on or through the body, the structural ridge network extending on the body only to an edge of the optical pattern, the structural ridge network being integral with the substrate, the structural ridge network having a plurality of ridges that are at least one of adjacent and intersecting each other, the plurality of ridges include some ridges that intersect other ridges, wherein the structural ridge network has a three dimensional lattice arrangement.

10. The gobo of claim 9, wherein the optical pattern is formed on the substrate monolithically with the body.

11. The gobo of claim 9, wherein the optical pattern is formed through the substrate monolithically with the body.

12. The gobo of claim 9, wherein the substrate is at least one of a glass, a plastic, a metal, and a composite material.

13. The gobo of claim 9, wherein the structural ridge network is on the two faces.

14. The gobo of claim 9, wherein the structural ridge network includes surface area of the faces that are perpendicular to the face.

15. The gobo of claim 9, wherein the structural ridge network includes at least one of linear ridges, cylindrical ridges, pattern traced edges and spires.

16. A gobo, comprising:
a substrate having:
at least one peripheral edge;
a body extending from the edge, the body having two faces and a structural ridge network on at least one of the two faces, the structural ridge network generally extending to the peripheral edge; and
an optical pattern disposed on or through the body, the structural ridge network extending on the body only to an edge of the optical pattern, the structural ridge network being integral with the substrate, the structural ridge network having a plurality of ridges that are at least one of adjacent and intersecting each other, the plurality of ridges include some ridges that intersect other ridges, wherein the integral structural ridge network is formed using peaks and troughs having a micro-reflective absorption surface.

17. The gobo of claim 16, wherein the optical pattern is formed on the substrate monolithically with the body.

18. The gobo of claim 16, wherein the optical pattern is formed through the substrate monolithically with the body.

19. The gobo of claim 16, wherein the substrate is at least one of a glass, a plastic, a metal, and a composite material.

20. The gobo of claim 16, wherein the structural ridge network is on the two faces.

* * * * *